March 28, 1939.                J. AREITER                2,152,170

METHOD OF PREPARING ICING

Filed May 5, 1937

INVENTOR
John Areiter
BY
ATTORNEY

Patented Mar. 28, 1939

2,152,170

UNITED STATES PATENT OFFICE 2,152,170

METHOD OF PREPARING ICING

John Areiter, Lynbrook, N. Y.

Application May 5, 1937, Serial No. 140,801

5 Claims. (Cl. 99—139)

This invention relates to ready-to-use food products in general, and especially to a confectionery product which is applicable for use in the form of cake spreads, icings, fillings, cake decorations, puddings, ice creams, sauces, pastries, etc., and which is intended to be handled in sealed containers, such as jars, cans, and like vessels, for distribution to the household and the trade.

The principal objects of my invention are to produce a food product of this kind which will be extremely stable, not only while under hermetic seal, but also upon its exposure to air for prolonged periods of time, and which has the added important properties of forming immediately upon exposure to air a thin, relatively soft, glossy, protective crust at its exterior, and which will neither spoil nor harden to inedibility or lose its taste or flavor; and which will not "run" when applied in multiple superimposed layers, or which will not fuse when applied in strips or spots in adjacent relation to one another.

This product is not to be confused with what is known as cake icing or cake decoration material, which latter becomes objectionably hard after a relatively short period of time of exposure, or with a fondant mixture such as used for fillings of chocolate or otherwise covered candy, or other similar products used as "spreads" upon cakes, cookies and like edibles. My invention fundamentally differentiates from an icing in that it remains internally soft, yet forms a thin, protective crust which is glossy in appearance and which forms a spreading bar against fusion with a spur-imposed layer or layers of the same material. My invention differs from a fondant in that it in itself will for weeks retain, below its own rapidly formed outer crust, its original consistency or nearly such consistency, and will not harden to inedibility, as is the case with fondant when its especially applied chocolate or other outer protective layer is either removed, or when the fondant is left without an artificial covering. Furthermore, my product will not form "liquid centers" when used in relatively large pieces, as is the case with many fondants. It remains paste-like and uniform in consistency for a sufficiently long time period, so that its edibility outlasts that of cakes or other products to which it is applied.

Another important object of my invention is the process whereby the product, having the aforesaid properties, is produced.

A further object of my invention is to provide a ready-to-use food product of the aforesaid qualities contained in a sealed vessel.

The foregoing and still further objects of my invention will become more fully apparent from the ensuing description, in connection with the accompanying drawing, which latter is illustrative of certain important qualities of my product, but which drawing by no means is intended to limit me to the actual showing, and in which Fig. 1 illustrates a hermetically sealed jar containing my pre-prepared food product;

Figure 1:
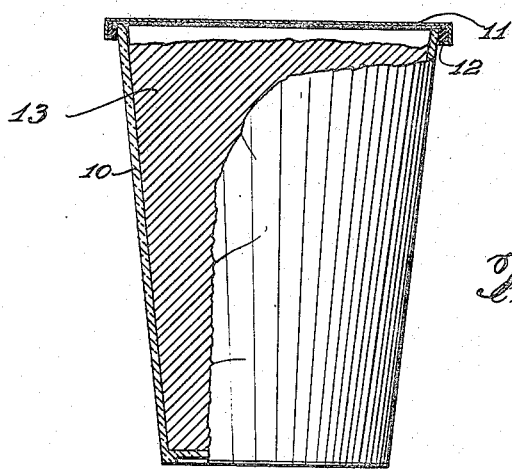

Referring now to the drawing, numeral 10 denotes a jar preferably of glass, which is covered by a closure 11, hermetically sealed at 12 against the jar, and in which jar is placed my food product indicated at 13. The filled jar as shown is intended to be distributed to the trade or to the household and it will retain my food product in its original state without permitting the latter to deteriorate in any way, so that when the jar is opened, the product is ready for use.

Figure 2:
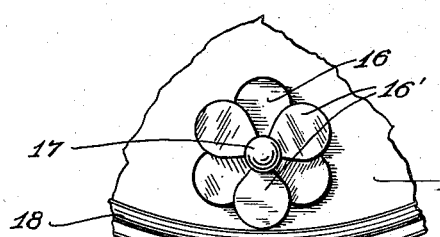
Fig. 2 is a top view of a portion of a cake covered with my product, and decorated therewith.
Figure 3:
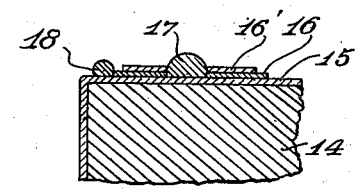
Fig. 3 is a typical cross-sectional view through a cake equipped with my food product, as shown in Fig. 2.

In Figs. 2 and 3 is shown a portion of a cake, marked 14, provided with an outer layer of my product indicated at 15, upon which outer layer is superimposed a decoration consisting of two layers of petals 16 and 16' of a flower, in the center of which petals is provided a thickened portion 17 representing the calyx or center of the flower. Near the rim of the cake there is shown a border 18. It will be observed that the cake covering layer or spread 15 is entirely separate from the first layer 16 of the bottom petals of the flower, which in turn are separated from the upper layer of petals 16', and from which two layers and from the bottom layer calyx 17 is also completely separated. The same applies to border 18, which is superimposed upon layer 15 and is entirely separated from the underlayer of petals 16 as clearly seen in Fig. 3.

Figure 4:
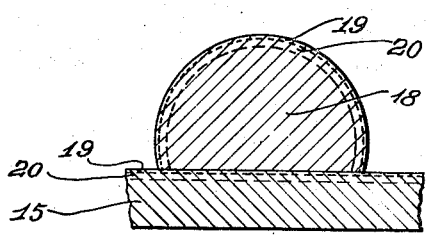
Fig. 4 is an enlarged cross-sectional view through a layer applied to a cake or other food material with a superimposed decorative layer.

A magnified illustration of my applied product is seen in detail in Fig. 4, where cake layer or spread 15 supports border 18, as observed under a microscope. From this figure it will become clear that there are formed two distinctive layers. One is an extreme outer layer 19, defined between the exterior full lines and the next adjacent dotted lines, which layer represents a very thin, semi-hard protective crust. Adjacent to that crust is a layer 20, defined between the two parallel broken lines. This layer represents a second protective film consisting of a relatively tough precipitate which forms immediately beneath the outer crust. This precipitate is also relatively thin, but is not hard; yet it is so dense that it will prevent any moisture within from evaporating. Thus practically the entire body of the product remains relatively soft and of uniform consistency for extensive periods of time, whereby its palatability, flavor and coloring is also preserved.

During my extended experience in the manufacture of decorations, spreads and ornaments in the pastry line, I have often been confronted with the undesirable qualities of ready-made or specially prepared compositions prepared in accordance with heretofore used formulas, and I have found that most products thus obtained were either not edible after a short period of exposure to air, becoming either too hard or running, or losing the flavor or color, or their qualities were impaired in many other ways, such as, for instance, by disintegration or becoming spoiled.

The present invention is designed to overcome heretofore experienced faults of similar products, and after considerable experimentation, I have finally produced an article which will be stable and will not deteriorate as to its uniform consistency, flavor, aroma, palatability, color, edibility, and which will withstand prolonged exposure to air, and will be capable of retaining its qualities indefinitely while kept covered in jars or similar containers.

In carrying out my invention, I employ any one of the following procedures, depending upon the particular characteristic of the product desired. Thus, for instance, I dissolve a certain quantity of sugar in water, whereupon I add some table salt, and preferably citric acid, and subject the solution to a rapid or sudden boiling over high heat in an open vessel, without otherwise agitating the solution mechanically in any way. While the solution is boiling, foam is forming and rises to the surface which I skim off from time to time until the solution becomes clear and pure and the formation of foam stops. Then I add a certain quantity of white corn syrup, whereupon I cover the vessel and subject the mixture to a second boiling under pressure until a temperature of between 226° to 227° F. is reached. Now I add a hot mixture of vegetable coloring and a highly emulsified vegetable oil and subject the mixture to a vigorous stirring operation or creaming, until the creamed mixture is cooled to about 70°. Then I permit the mixture to "age" for about 24 hours. Now I introduce a mixture of distilled water and fruit flavors and recream the mixture to a smooth, uniform consistency, upon which I place the mixture into jars and hermetically seal them. The thus produced product may be readily used as a spread or light decoration, inasmuch as it is relatively fluid.

A slightly modified procedure is employed for producing my composition which is intended to be of a somewhat stiffer consistency. I dissolve sugar in water, add thereto some salt and citric acid, and permit the mixture to boil in an open vessel over a hot flame. I again remove the forming foam until the mixture becomes clear and the foam formation stops. Then I add syrup, close the vessel and reboil it to a temperature ranging from 226° to 227° F. Now I open the vessel, slowly cool this mixture and permit it to settle by sprinkling over it cold water, whereupon I subject the settled mixture to a creaming operation until its texture becomes smooth and uniform. I permit the creamed mixture to cool further to about 70° and introduce thereinto a mixture of fruit flavor and vegetable coloring, whereupon the mixture is again stirred or creamed so that the coloring and flavoring will be thoroughly intermixed and distributed. Then I add a highly emulsified vegetable oil and subject the entire admixture to another creaming operation, whereupon the product is ready to be placed into containers and sealed.

A third modified way of producing a food product somewhat similar in texture to that obtained by the first mentioned formula, but which is even more fluid and which can serve as a readily applicable covering or decoration for large and small cakes, or may be used for puddings, ice creams, sauces, fillings for cookies and crackers, is obtained in the following manner: Again I dissolve sugar in water, heat the solution over a high flame to a boiling point, while not stirring it in any other way, but removing the forming and rising foam from the surface until the solution becomes clear. Now I again add corn syrup whereupon I close the vessel and subject the mixture to a rapid boiling operation until a temperature of between 226° and 227° F. is reached. Now I add emulsified cottonseed oil and reboil the mixture. Before this reboiling, I add salt, citric acid and coloring to the mixture immediately after the aforesaid temperature is reached. I then stop the mixture from boiling and permit it to sufficiently cool so it may be subjected to a vigorous creaming operation. The latter continues until the mixture becomes smooth and fluffy and cool enough to absorb a fruit flavoring which I now introduce. Thereupon I recream the entire mixture so that the flavoring is completely distributed throughout. Now the mixture may be put in jars and sealed.

For the purpose of producing a relatively stiff composition, I employ the above stated ingredients in the following proportions: 500 parts of granulated sugar; 50 parts of white corn syrup; 2 parts salt; 250 parts water; 65 parts of emulsified, sterile cottonseed oil; 1 part vegetable coloring; 2 parts of citric acid; 2 parts of fruit flavoring. For a looser mixture, I introduce the fruit flavoring in solution with 16¼ parts of distilled water. The composition without the additional 16¼ parts of water is primarily intended for producing decorations over a cake spread, or icing, and may be used as a very tasty and glossy icing in itself. "Heavy" decorations with this mixture are made possible, such as inscriptions, borders, flowers, imitation of birds, animals, etc.

The mixture containing the additional 16¼ parts of water is especially designed for making smooth and creamy puddings, ice creams, sauces, fillings for cookies and crackers, and smooth coverings or icings for different kinds of cakes and pastries. The flavorings employed in my mixture may be produced from either fruits or any other material and I shall enumerate a few, such as vanilla, pistachio, strawberry, raspberry, coffee, pineapple, banana, chocolate, etc. The coloring used in my composition is preferably made of purely vegetable nature as obtained from spinach, carrots, red beets, and others naturally colored vegetables.

As acid agent employed in my composition, I prefer to use citric acid, although cream of tartar may be substituted, but does not produce the same good results as I have obtained with citric acid. It will be observed that I introduce coloring matter to my mixture preferably while the latter is in its hot state so that I am assured of a thorough distribution of the coloring. On the other hand, the flavoring is preferably introduced when the mixture is either "aged" or cool enough so that it will not be dissipated through heat. The vegetable oil which I use is preferably pure and highly emulsified cottonseed oil. Although other similar oils may be employed, I find that emulsified cottonseed oil gives the best results.

In each of the three outlined procedures of compounding my mixture, I have also experimented with the introduction of a preserving medium in the form of benzoate of soda, ranging from .1% to .3% of the entire quantity of the mixture. While the small percentage of benzoate of soda does not in any way alter the taste, flavor, or other good characteristics of my product, it preserves it against spoilage if by inadvertence a jar or other container may be left open for very long periods of time. I have found that with the addition of benzoate of soda, my mixture will remain unchanged for months at a time.

A very important advantage of my composition resides in the fact that while, when the mixture is applied to cakes, tarts and other articles intended to be richly decorated, its interior remains paste-like and relatively soft, its own rapidly forming outer crust permits practically immediate wrapping-up or packing of the decorated articles for shipment without fear that the decoration will collapse or be damaged, the outer crust forming an effective protection.

As stated at the outset of this specification, my product is not to be mistaken for fondants, icings or spreads known heretofore and extensively used, inasmuch as the qualities and properties of those products are entirely different from the superior properties of my composition, which retains its flavor, aroma, its coloring, its consistency, and is practically permanent in its stability, and does not lose its creamy characteristic and softness upon prolonged exposure to air.

While I have specified certain ways of compounding my composition and stated various steps and proportions of ingredients, be it understood that slight variations, as indicated, may be readily brought about, and I therefore reserve for myself the right to make changes and improvements in my composition, and the process of producing same, without departing from the broad scope of my idea, as set forth in the annexed claims.

I claim:

1. The process of preparing a stable, ready-to-use, non-hardening food product for the purposes specified, consisting of subjecting to sudden hard boiling, a mixture of sugar, salt, and acid agent, in the form of citric acid and water in an open vessel, without otherwise agitating the mixture, removing the foam rising to the surface until the mixture becomes clear and the formation of foam stops, adding syrup to the clear mixture, closing the vessel and continuing the boiling operation under pressure, without stirring or otherwise agitating the mixture, until a temperature of between 226° to 227° F. is reached, adding at this stage a hot mixture of pure, emulsified, sterile vegetable oil, vegetable coloring and water, continuing the boiling under pressure until the aforesaid temperature is again reached, permitting the admixture to cool and age for about 24 hours, thoroughly mixing fruit flavoring and water, adding this flavored water to the aged admixture, mixing the whole to a creamy, uniform consistency, placing the thus "creamed" product into containers and hermetically sealing it.

2. In a process as set forth in claim 1, and wherein the ingredients employed are used in the following proportion by volume: 500 parts of sugar, 50 parts of syrup, 2 parts of salt, 2 parts of citric acid, 266¼ parts of water, 1 part of vegetable coloring, 2 parts of flavoring, and 65 parts of emulsified, sterile, vegetable oil.

3. In a process as set forth in claim 1, and wherein the ingredients used consist of 500 parts of granulated sugar, 50 parts of white corn syrup, 2 parts of table salt, 2 parts of citric acid, 1 part of pure vegetable coloring, 2 parts of fruit flavoring, 65 parts of emulsified, pure and sterile cottonseed oil and 250 parts of water.

4. The process of preparing a stable, ready-to-use, non-hardening food composition for decorative and like purposes, consisting of subjecting to sudden, hard boiling, without otherwise agitating, a mixture of sugar, salt, citric acid and water, in an open vessel, removing the foam rising to the surface until the mixture becomes clear and the formation of foam stops, adding syrup, a water-mixed, hot vegetable coloring and a hot, sterile emulsified vegetable oil, covering the vessel and boiling the mixture under pressure at between 226° to 227° F., permitting the composition to cool and age for about 24 hours, adding flavoring to the aged composition and creaming it to a smooth, uniform consistency, while cold, placing the creamed composition into containers and hermetically sealing them.

5. The process of preparing a stable, ready-for-use, non-hardening food composition for cake decorations, icings, and the like, consisting of dissolving sugar in water, adding salt, subjecting the solution to a rapid boiling operation in an open vessel and removing the forming and rising foam until the solution becomes clear, adding syrup and citric acid thereto, covering the vessel, and reboiling the solution under pressure at a temperature of between 216° to 217° F., sprinkling water over the solution and permitting it to settle, thereafter vigorously stirring it until smooth and creamy, cooling the creamed mixture to about 70° F., adding fruit flavoring, vegetable coloring and emulsified vegetable oil, and recreaming the mixture until uniform, placing it in containers and hermetically sealing them.

JOHN ARETTER.